(12) United States Patent
Nakamoto et al.

(10) Patent No.: US 11,556,110 B2
(45) Date of Patent: Jan. 17, 2023

(54) METHOD AND DEVICE FOR GENERATING TOOL PATHS

(71) Applicant: MAKINO MILLING MACHINE CO., LTD., Tokyo (JP)

(72) Inventors: Keiichi Nakamoto, Tokyo (JP); Mayu Hashimoto, Tokyo (JP); Kazumasa Kono, Kanagawa (JP); Katsuhiko Takei, Kanagawa (JP); Shinji Igari, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/976,931

(22) PCT Filed: Feb. 14, 2019

(86) PCT No.: PCT/JP2019/005359
§ 371 (c)(1),
(2) Date: Aug. 31, 2020

(87) PCT Pub. No.: WO2019/167650
PCT Pub. Date: Sep. 6, 2019

(65) Prior Publication Data
US 2021/0003992 A1 Jan. 7, 2021

(30) Foreign Application Priority Data
Mar. 1, 2018 (JP) .............................. JP2018-036408

(51) Int. Cl.
*G05B 19/4093* (2006.01)
*G06N 3/08* (2006.01)

(52) U.S. Cl.
CPC ............. *G05B 19/40937* (2013.01); *G05B 19/40931* (2013.01); *G06N 3/08* (2013.01)

(58) Field of Classification Search
CPC ........ G05B 19/40937; G05B 19/40931; G05B 19/4093; G05B 2219/33027;
(Continued)

(56) References Cited

U.S. PATENT DOCUMENTS

| 5,473,532 A | 12/1995 | Unno et al. |
|---|---|---|
| 2002/0082742 A1 | 6/2002 | Kadono |
| 2005/0251284 A1* | 11/2005 | Balic .................. G05B 19/4099 700/182 |

(Continued)

FOREIGN PATENT DOCUMENTS

| CN | 101738981 A | 6/2010 |
|---|---|---|
| JP | H4-138504 A | 5/1992 |

(Continued)

OTHER PUBLICATIONS

International Search Report and Written Opinion dated Apr. 9, 2019, directed to International Application No. PCT/JP2019/005359, 17 pages.

*Primary Examiner* — Kenneth M Lo
*Assistant Examiner* — Mohammed Shafayet
(74) *Attorney, Agent, or Firm* — Morrison & Foerster LLP

(57) ABSTRACT

The step for performing machine learning includes acquiring shape data; acquiring geometric information for each of a plurality of machining faces; acquiring a tool path pattern selected for the machining faces from among a plurality of tool path patterns; and performing machine learning by using the geometric data for known workpieces and the tool path patterns wherein the input is the geometric information for the machining faces and the output is the tool path pattern for the machining faces. The step for generating a new tool path includes: acquiring shape data for the workpiece; acquiring geometric information for each of the plurality of machining faces of the workpiece to be machined; and generating a tool path pattern for each of the (Continued)

plurality of machining faces on the workpiece on the basis of the results of the machine learning using the geometric information of the workpiece to be machined.

5 Claims, 11 Drawing Sheets

(58) Field of Classification Search
CPC ...... G05B 2219/35097; G05B 19/4097; G06N 3/08; G06N 3/084; Y02P 90/02; B23Q 15/00
USPC .......................................................... 700/48
See application file for complete search history.

(56) References Cited

U.S. PATENT DOCUMENTS

| | | | |
|---|---|---|---|
| 2007/0083291 A1* | 4/2007 | Nagatsuka | B23K 26/0884 700/252 |
| 2013/0054182 A1* | 2/2013 | Tezuka | G05B 19/408 702/141 |
| 2016/0180195 A1* | 6/2016 | Martinson | G06K 9/6202 382/103 |
| 2017/0031343 A1* | 2/2017 | Hatanaka | G05B 19/19 |
| 2018/0181108 A1* | 6/2018 | Nagano | G05B 19/4083 |
| 2018/0290246 A1* | 10/2018 | Mochida | B23K 26/38 |

FOREIGN PATENT DOCUMENTS

| | | | | |
|---|---|---|---|---|
| JP | H6-212880 A | | 8/1994 | |
| JP | H10-86039 A | | 4/1998 | |
| JP | 2002-189510 A | | 7/2002 | |
| JP | 2006-68901 A | | 3/2006 | |
| JP | 2006068901 A | * | 3/2006 | ............ B23Q 15/00 |
| JP | 2014-160303 A | | 9/2014 | |
| JP | 2016-170636 A | | 9/2016 | |
| JP | 2017-123088 A | | 7/2017 | |
| JP | 2017-146957 A | | 8/2017 | |

* cited by examiner

METHOD AND DEVICE FOR GENERATING TOOL PATHS

CROSS-REFERENCE TO RELATED APPLICATIONS

This application is a US National Stage Application under 35 USC 371 of International Patent Application No. PCT/JP2019/005359, filed on Feb. 14, 2019, which claims the priority of JP Application No. 2018-036408, filed on Mar. 1, 2018, the entire contents of each of which are incorporated herein by reference.

FIELD OF THE INVENTION

The present invention relates to a method and device for generating a tool path.

BACKGROUND OF THE INVENTION

Conventionally, various technologies for supporting NC (Numerical Control) machining have been proposed. For example, Patent Literature 1 discloses a method and device for supporting mold design using NC data. In Patent Literature 1, when designing a mold using the NC data of an existing mold, CAM data of the existing mold and CAM data of the design target mold are compared, and for each machining location, it is determined whether or not the data of the existing mold can be used. The ratio between the number of machining locations where the data of the existing mold can be used and the total number of machining locations is calculated as a diversion rate. A neural network is used in the calculation of the diversion rate.

Patent Literature 2 discloses a device for supporting the generation of tool path data in an NC machine tool. In Patent Literature 2, tool path data is automatically generated based on characteristic data of the three-dimensional shape of the product, material data, data on each machining step, data on the shape after each machining step, and data on usable tools.

PATENT LITERATURE

[PTL 1] Japanese Unexamined Patent Publication (Kokai) No. 2014-160303
[PTL 2] Japanese Unexamined Patent Publication (Kokai) No. 2002-189510

BRIEF SUMMARY OF THE DISCLOSURE

The tool path in NC machining is sometimes generated by inputting various data into CAM software based on the experience and know-how of the operator. However, when the operator is inexperienced, particularly when the workpiece has a complex shape, it is difficult to generate a desired tool path.

The present invention aims to provide a method and device for generating a new tool path based on multiple examples.

An aspect of the present disclosure provides a method for generating a tool path in NC machining, the method comprising the steps of performing machine learning based on information of a plurality of known workpieces having already generated tool paths, and generating a new tool path for a target workpiece based on results of the machine learning, wherein each of the plurality of known workpieces and the target workpiece has a plurality of machining surfaces, the step in which machine learning is performed includes for each of the plurality of known workpieces, obtaining shape data, for each of the plurality of known workpieces, obtaining geometric information of each of the plurality of machining surfaces, for each of the plurality of known workpieces, obtaining a tool path pattern selected for each of the plurality of machining surfaces from among a plurality of tool path patterns, and performing machine learning in which input is geometric information of a machining surface and output is a tool path pattern of the machining surface, with using the geometric information and the tool path patterns of the plurality of known workpieces, and the step in which a new tool path pattern is generated includes obtaining shape data of the target workpiece, obtaining geometric information of each of the plurality of machining surfaces of the target workpiece, and generating a tool path pattern for each of the plurality of machining surfaces of the target workpiece based on results of the machine learning, with using the geometric information of the target workpiece.

In the method according to the aspect of the present disclosure, machine learning, in which the input is geometric information of a machining surface and the output is a tool path pattern of a machining surface, is performed based on the geometric information and tool path patterns of a plurality of known workpieces, and based on the results of this machine learning, a tool path pattern for each of the plurality of machining surfaces of the target workpiece is automatically generated. Thus, a new tool path can be generated based on multiple examples.

The plurality of tool path patterns may include at least a contour path, a scanning line path, and a surface path.

The shape data of the plurality of known workpieces and the shape data of the target workpiece may be defined in an XYZ coordinate system which is a three-dimensional cartesian coordinate system, and the geometric information may include at least one of a machining surface type, a ratio of a maximum length in an X-axis direction to a maximum length in a Z-axis direction of each machining surface, a ratio of a maximum length in a Y-axis direction to a maximum length in the Z-axis direction of each machining surface, a ratio of a Z-axis direction maximum length of the entirety of the plurality of machining surfaces to a Z-axis direction maximum length of each machining surface, a ratio of a surface area of the entirety of the plurality of machining surfaces to a surface area of each machining surface, a long radius of a machining surface, a short radius of a machining surface, a Z component of a normal vector at a center of gravity of a machining surface, a maximum curvature of a machining surface, and a minimum curvature of a machining surface.

A neural network may be used in the machine learning.

Another aspect of the present disclosure provides a device for generating a tool path in NC machining, the device comprising a processor and a display unit, wherein the processor is configured so as to perform machine learning based on information of a plurality of known workpieces having already generated tool paths, and generate a new tool path for a target workpiece based on results of the machine learning, each of the plurality of known workpieces and the target workpiece has a plurality of machining surfaces, the step in which machine learning is performed includes for each of the plurality of known workpieces, obtaining shape data, for each of the plurality of known workpieces, obtaining geometric information of each of the plurality of machining surfaces, for each of the plurality of known workpieces, obtaining a tool path pattern selected for each of the plurality of machining surfaces from among a plurality of tool path patterns, and performing machine learning in which input is geometric information of a machining surface and output is a tool path pattern of the machining surface, with using the geometric information and the tool path patterns of the plurality of known workpieces, the step in which a new tool path pattern is generated includes obtaining shape data of the target workpiece, obtaining geometric information of each of the plurality of machining surfaces of the target workpiece, and generating a tool path pattern for each of the plurality of machining surfaces of the target workpiece based on results of the machine learning, using the geometric information of the target workpiece, each of the plurality of tool path patterns is assigned a predetermined feature which can be visually distinguished, the processor recognizes the plurality of tool path patterns as the predetermined feature, and the display unit displays each of the machining surfaces along with the predetermined feature corresponding to a generated tool path pattern. Such a device can achieve the same effects as the method described above. Furthermore, in such a device, since each machining surface is displayed on the display unit along with predetermined characteristics corresponding to generated tool path patterns, the operator can easily recognize which tool path pattern has been selected for the machining surface.

The processor may be configured so as to calculate a confidence factor for the tool path pattern generated for each of the plurality of machining surfaces of the target workpiece, and the display unit may emphasize a corresponding machining surface when the confidence factor is less than a predetermined threshold. In this case, the operator can change the tool path pattern for a machining surface having a low confidence factor as needed.

According to the aspect of the present disclosure, it is possible to provide a method and device for generating a new tool path based on multiple examples.

DETAILED DESCRIPTION OF THE DISCLOSURE

The method and device for generating a tool path in NC machining of the embodiments will be described below with reference to the attached drawings. Identical or corresponding elements have been assigned the same reference signs, and duplicate descriptions thereof have been omitted.

Figure 1:
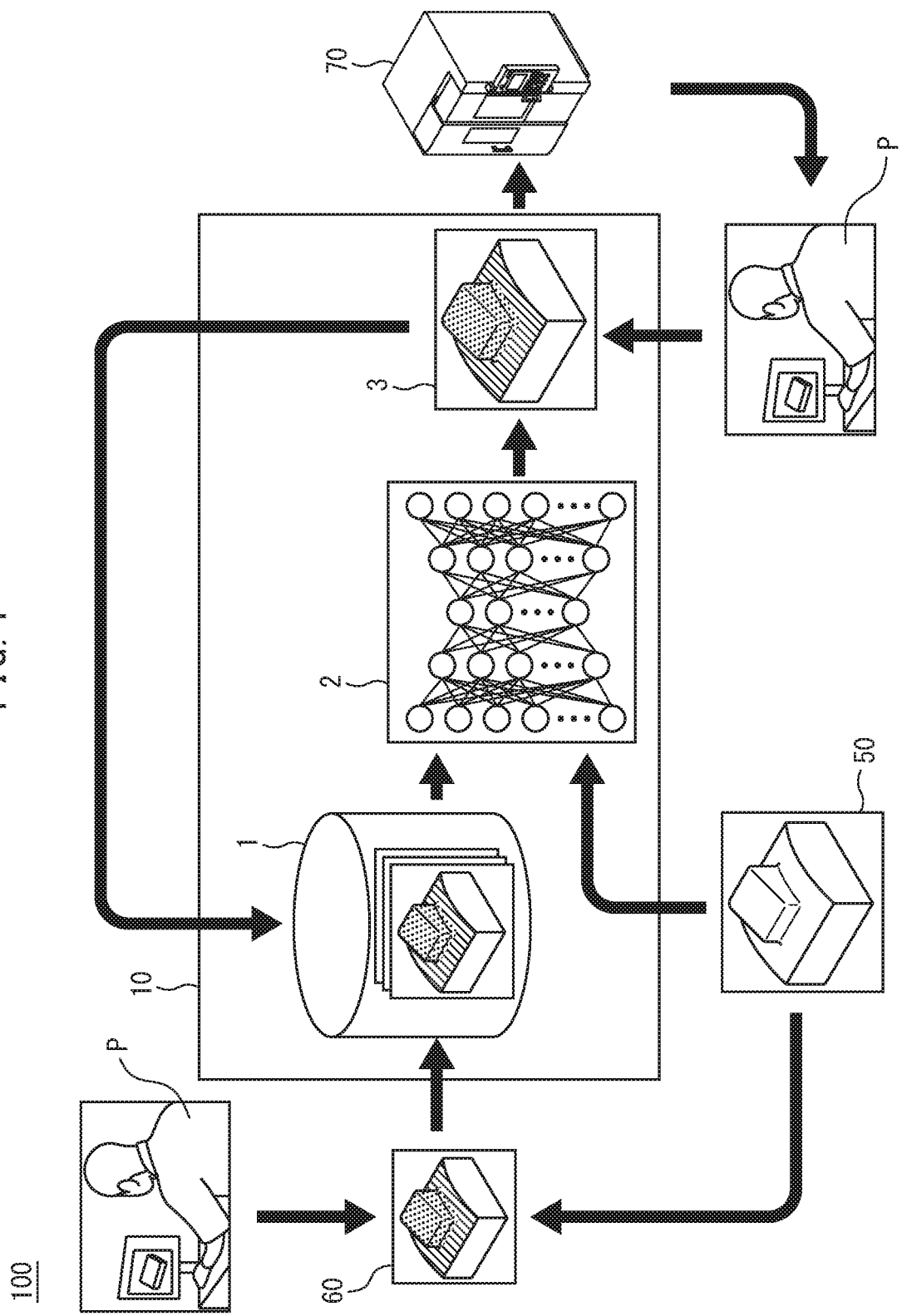
FIG. 1 is a schematic view showing a method and device of the present disclosure.

FIG. 1 is a schematic view showing the method and device of the present disclosure. The method of the present disclosure is executed by a system 100 having a CAD (Computer Aided Design) system 50, a CAM (Computer Aided Manufacture) system 60, a device 10 for generating a tool path, and a machine tool 70. The system 100 may comprise other components.

In the CAD system 50, CAD data of workpiece is created. Examples of workpiece include molds. The workpieces represented by CAD data have a target shape after being machined by a tool. In the CAD system 50, the CAD data of "known workpieces" (hereinafter may also be referred to as training data) serving as training data when the device 10 performs machine learning and CAD data of a "target workpiece" for which a new tool path is created based on the results of the machine learning are created. Note that "known workpieces (training data)" may be actually created workpieces, or may be workpieces which have only been created as electronic data and for which the tool path was set by a skilled operator.

The CAD data includes shape data such as the vertices, edges, and surfaces included on the workpiece. The CAD data may be defined in, for example, the XYZ coordinate system, which is a three-dimensional cartesian coordinate system. The CAD data may be defined in another coordinate system. The workpiece includes a plurality of machining surfaces surrounded (or divided) by character lines. The CAD data includes various geometric information (for example, a machining surface type, a ratio of a maximum length in an X-axis direction to a maximum length in a Z-axis direction of each machining surface, a ratio of a maximum length in a Y-axis direction to a maximum length in the Z-axis direction of each machining surface, a ratio of a Z-axis direction maximum length of the entirety of the plurality of machining surfaces to a Z-axis direction maximum length of each machining surface, a ratio of a surface area of the entirety of the plurality of machining surfaces to a surface area of each machining surface, a long radius of a machining surface, a short radius of a machining surface, a Z component of a normal vector at a center of gravity of a machining surface, a maximum curvature of a machining surface, and a minimum curvature of a machining surface) for each of the plurality of machining surfaces. The CAD data may include other geometric information The CAD data of the known workpieces is input to the CAM system 60. In the CAM system 60, the operator (in particular, a skilled operator) P selects, for each of the plurality of machining surfaces of the known workpieces, for example, the tool path pattern used for such machining surfaces in actual machining in the past, or the tool path pattern considered suitable for the machining of such machining surfaces, from among a plurality of tool path patterns. By combining the plurality of tool path patterns selected for the plurality of machining surfaces, a single workpiece toolpath is generated.

Figure 2:
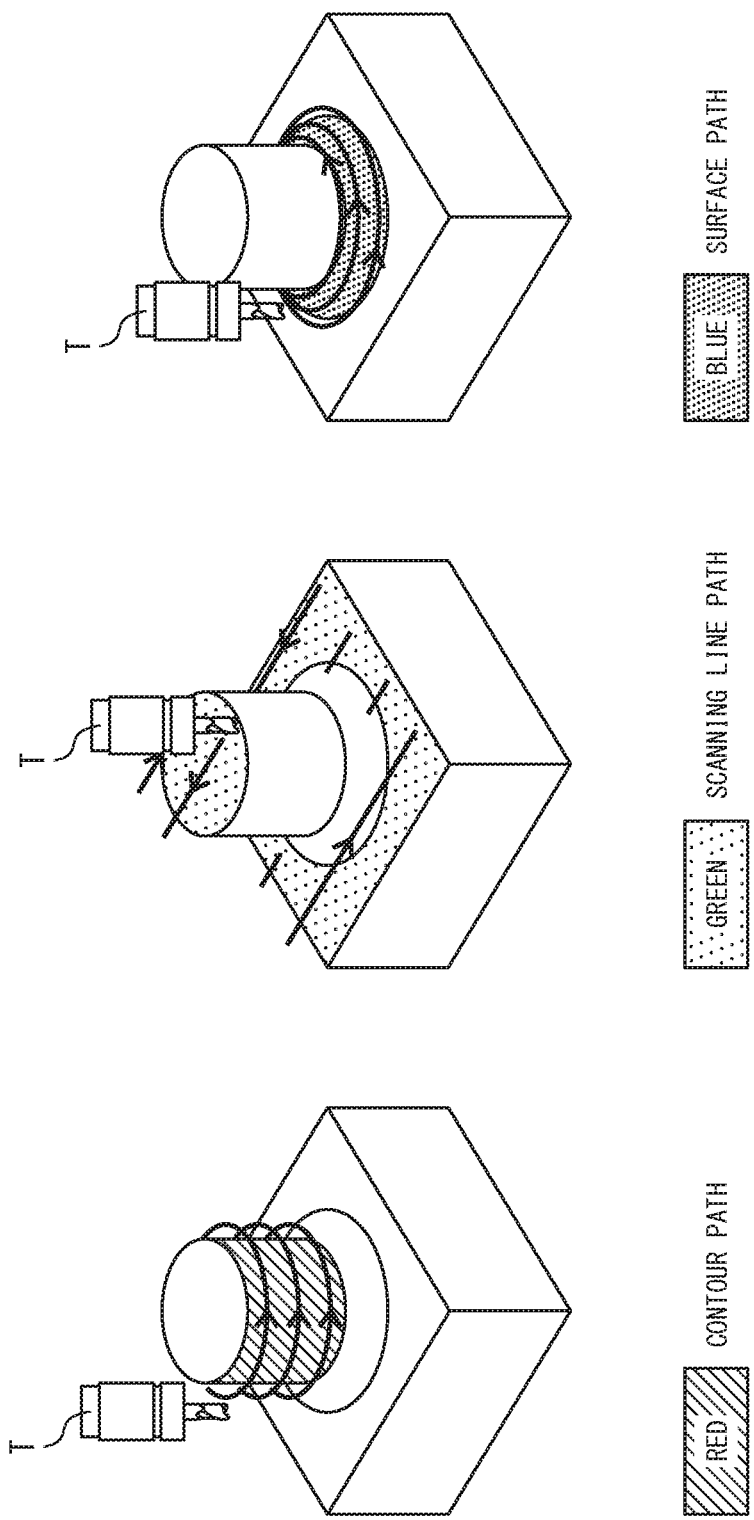
FIG. 2 is a schematic view showing some tool path patterns.
Figure 3:
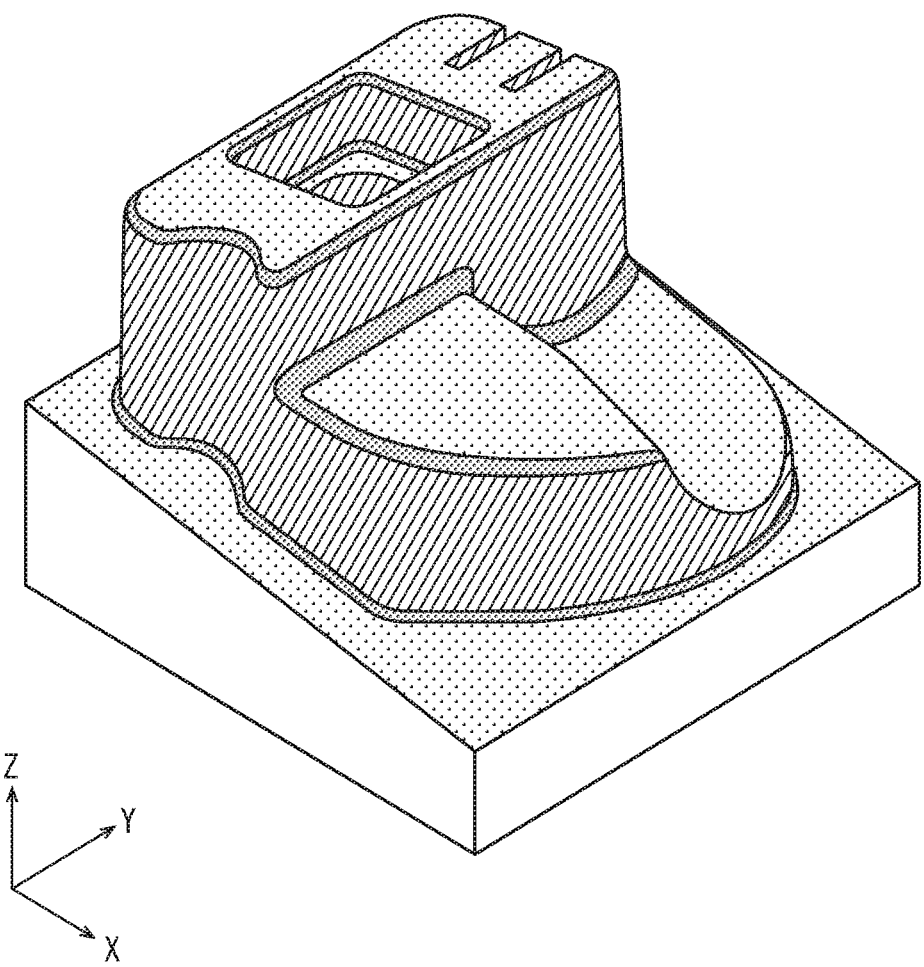
FIG. 3 is a perspective view showing an example of training data.
Figure 4:
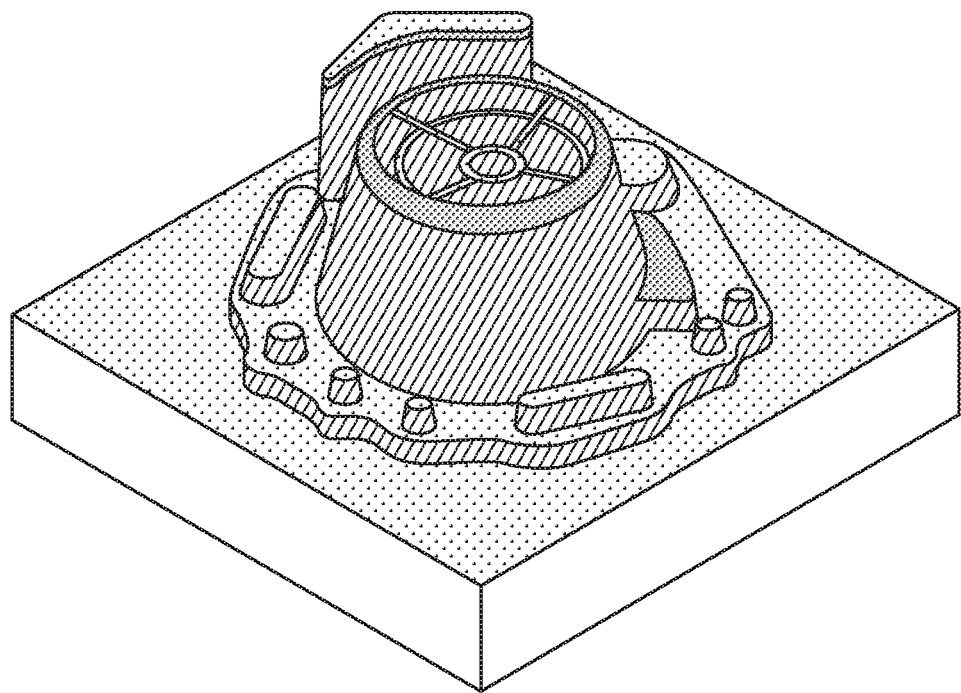
FIG. 4 is a perspective view showing an example of training data.
Figure 5:
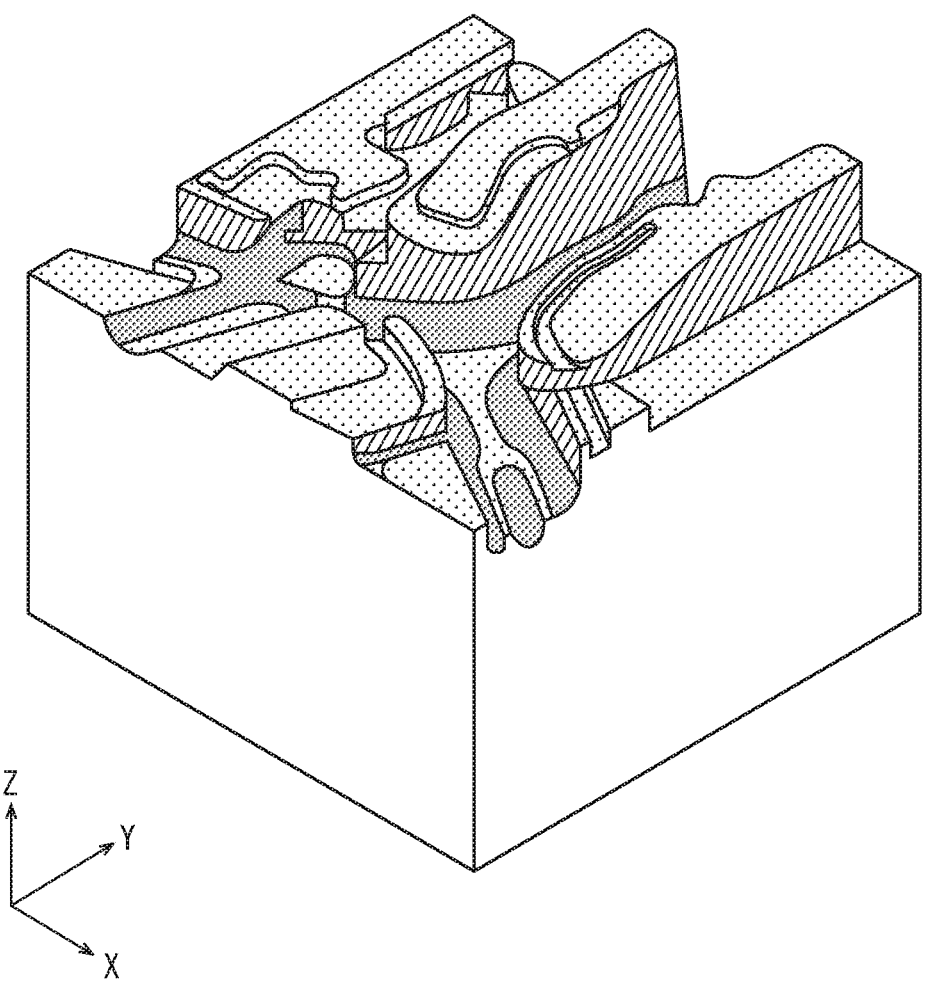
FIG. 5 is a perspective view showing an example of training data.
Figure 6:
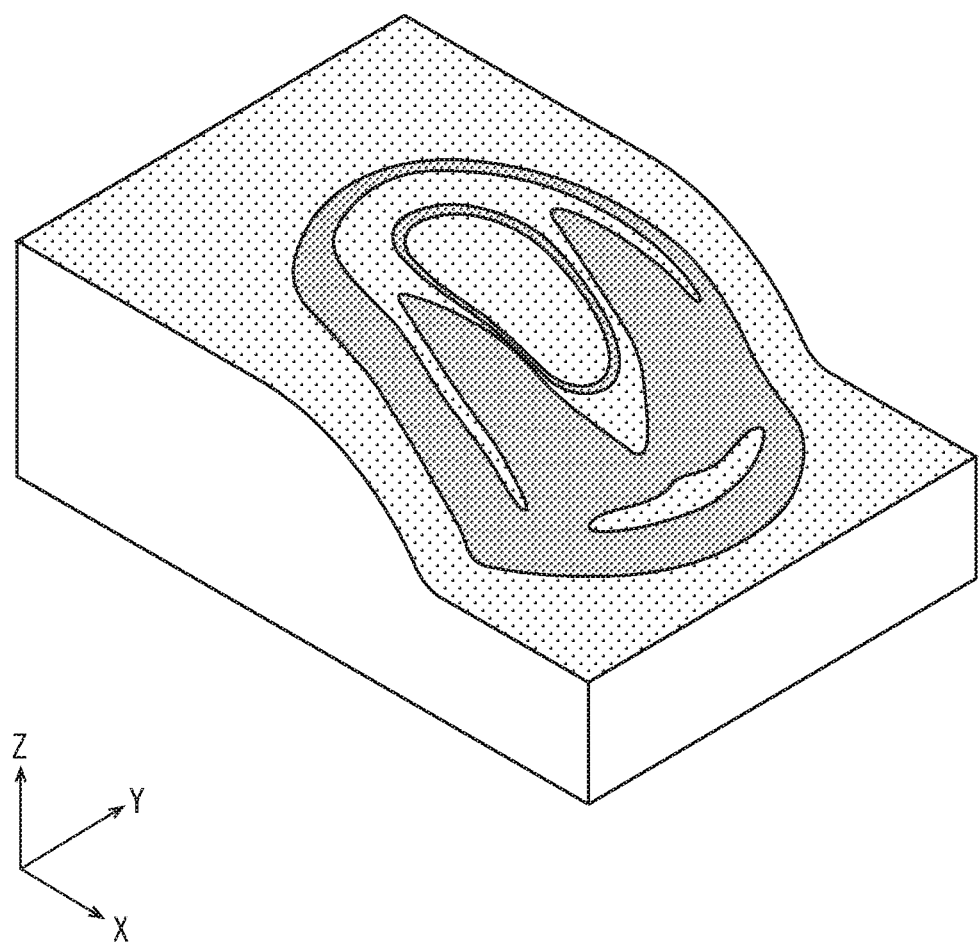
FIG. 6 is a perspective view showing an example of training data.

FIG. 2 is a schematic view showing some tool path patterns. The plurality of tool path patterns can include various tool path patterns. For example, a contour path is shown on the left side of FIG. 2. In contour paths, a tool T machines a machining surface by contouring operations. A scanning line path is shown in the center of FIG. 2. In scanning line paths, the tool T machines the machining surface so as to cover the area while following the machining surface. A surface path is shown on the right side of FIG.

2. In surface paths, the tool T machines the machining surface by movements along the boundaries of the machining surface. The plurality of tool path patterns may include tool path patterns other than the three tool path patterns described above (for example, spiral machining in which the tool moves spirally in the height direction while machining the machining surface).

In order to enable visual recognition of which tool path pattern has been selected on the machining surface, each of the plurality of tool path patterns is assigned a predetermined color. As shown in FIG. 2, for example, in the present embodiment, contour paths are assigned the color "red" on the selected machining surface, scanning line paths are assigned the color "green" on the selected machining surface, and surface paths are assigned the color "blue" on the selected machining surface. The display unit of the CAM system 60 displays each of the machining surfaces by a predetermined color corresponding to the selected tool path pattern. As a result, the operator P can easily recognize which tool path pattern has been selected on the machining surface. Note that in order to enable visual recognition of which tool path pattern has been selected on the machining surface, each of the plurality of tool path patterns may be assigned a predetermined characteristic with which each of the plurality of tool path patterns can be visually recognized (for example, a color, a pattern, and/or characters).

FIGS. 3 to 6 are perspective views showing examples of training data. The training data includes the shape data created by the CAD system 50, the geometric information calculated by the CAD system 50, and the tool path patterns selected with the CAM system 60. The tool path patterns are included in the training data as the colors assigned to the tool path patterns.

Referring again to FIG. 1, the training data is input into the device 10. As described above, the training data input into the device 10 already includes the generated tool path.

The device 10 comprises a storage device 1, a processor 2, and a display unit 3, and these components are connected to each other via busses (not illustrated). The device 10 may comprise other components such as a ROM (read only memory), a RAM (random access memory), and/or an input device (for example, a mouse and keyboard and/or a touch panel). The device 10 may be, for example, a computer, a server, or a tablet.

The storage device 1 may be one or a plurality of hard disk drives. The storage device 1 stores the input training data.

The processor 2 may be, for example a CPU (Central Processing Unit). The processor 2 may be constituted by, for example one CPU or may be constituted by a plurality of CPUs. The processor 2 is configured so as to execute the plurality of processes shown below, and the program for executing each process may be stored in, for example, the storage device 1. The processor 2 is configured so as to perform machine learning based on information of the plurality of sets of training data stored in the storage device 1 (details to be described later). In the machine learning, for example, a neural network may be used.

The processor 2 is configured so as to generate a new tool path for a target workpiece based on results of the machine learning described above using the CAD data of the target workpiece created by the CAD system 50 (details to be described later). The processor 2 is configured to calculate a confidence factor for the generated tool path pattern for each of the plurality of machining surfaces of the target workpiece.

The display unit 3 may be a liquid crystal display and/or a touch panel. Like the display unit of the CAM system 60, the display unit 3 displays each of the machining surfaces along with a predetermined characteristic (for example, a color, pattern, and/or characters), which enable visual recognition, corresponding to the generated tool path pattern.

The CAD system 50, CAM system 60, and device 10 described above may be configured as separate devices, or may be incorporated in the same device (for example, CAD software and CAM software may be incorporated in the device 10).

The new tool path generated by the device 10 may be converted into NC data and input into the machine tool 70.

Next, the operations executed by the device 10 will be described.

Figure 7:
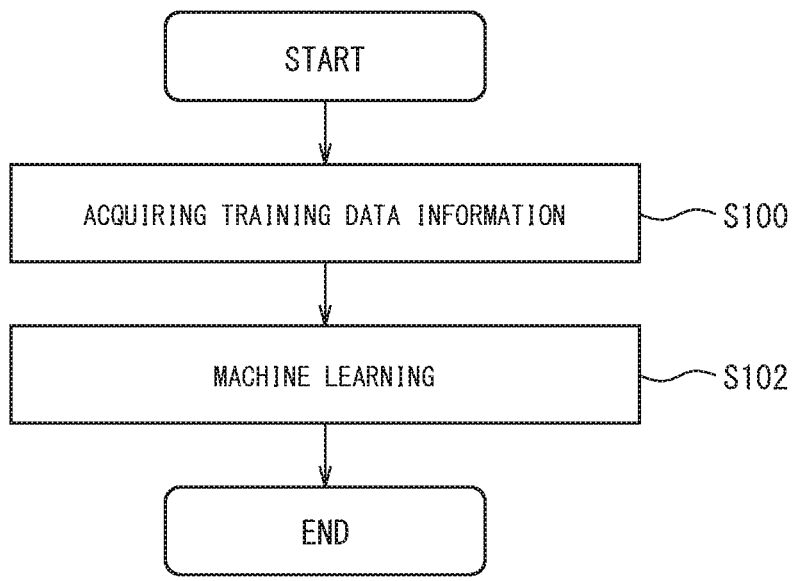
FIG. 7 is a flowchart illustrating machine learning executed by the device of FIG. 1.

First, the machine learning executed by the device 10 will be described. FIG. 7 is a flowchart illustrating the machine learning executed by the device of FIG. 1.

The processor 2 acquires information for each of the plurality of sets of training data from the storage device 1 (step S100). The acquired information includes the shape data, the geometric information of each of the plurality of machining surfaces, and the tool path (color) selected for each of the plurality of machining surfaces, of each set of training data. Next, the processor 2 performs machine learning in which the input is the geometric information of the machining surface and the output is the tool path pattern (color) of the machining surface, using the geometric information and the tool path pattern (color) of the plurality of sets of training data (step S102). Then, a series of operations is completed. The above steps may be repeated until a desired convergence result is obtained.

Figure 8:
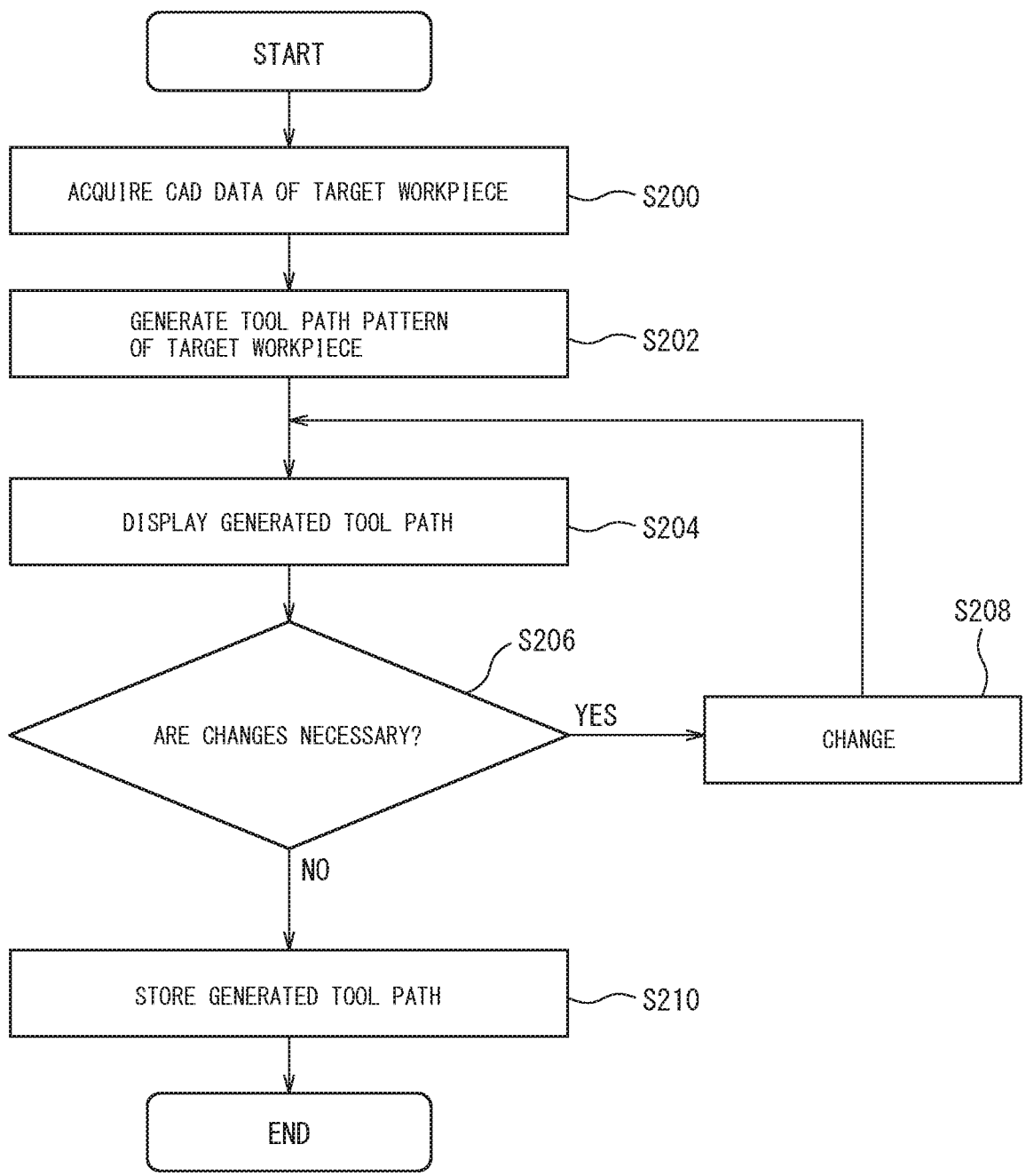
FIG. 8 is a flowchart illustrating the generation of a new tool path for a target workpiece executed by the device of FIG. 1.

Next, the generation of a new tool path for the target workpiece executed by the device 10 will be described. FIG. 8 is a flowchart illustrating the generation of a new tool path for a target workpiece executed by the device of FIG. 1.

The processor 2 acquires the CAD data of the target workpiece created by the CAD system 50 (step S200). The obtained CAD data includes the shape data and the geometric information of each of the plurality of machining surfaces, of the target workpiece.

Next, the processor 2 generates a tool path pattern for each of the plurality of the machining surfaces of the target workpiece based on the results of the machine learning described above using the geometric information of the target workpiece (step S202).

Specifically, in step S202, the processor 2 calculates, for each of the plurality of tool path patterns, the probability (alternatively may be referred to as confidence factor) that a certain machining surface is to be machined by the tool path pattern. More specifically, the processor 2 calculates, for each of the plurality of colors, a confidence factor that the color is to be selected to a certain machining surface. For example, in the present embodiment, the processor 2 calculates, for a certain machining surface, the confidence factor that red is to be selected, the confidence factor that green is to be selected, and the confidence factor that blue is to be selected, and selects the color (i.e., the tool path pattern) having the highest confidence factor to the machining surface. The processor 2 combines the plurality of selected tool path patterns to generate a tool path of the target workpiece, and transmits the generated tool path to the display unit 3.

Next, the display unit 3 displays the generated tool path of the target workpiece (step S204). Specifically, the display unit 3 displays each of the plurality of machining surfaces of the target workpiece in the selected color. At this time, the display unit 3 displays the selected color (tool path pattern) in accordance with the confidence factor. Specifically, when the confidence factor of the selected tool path pattern for the certain machining surface is less than a predetermined threshold, the display unit 3 emphasizes the machining surface (for example, displays a pale color or dark color). For example, though red is selected for the certain machining surface, when the confidence factor thereof is less than the predetermined threshold, the machining surface is displayed in pale red. As a result, the operator P can easily recognize that the confidence factor of the machining surface is low.

Next, the processor 2 receives, from the operator P, input as to whether or not changes are necessary (step S206). Specifically, when the operator P determines that the tool path pattern (color) of a certain machining surface (for example, the machining surface on which a low confidence factor is displayed in step 204) is not suitable, the operator P inputs a change command via the input device, whereby the tool path pattern (color) of the corresponding machining surface can be changed.

In the case in which there is an input indicating that change is necessary in step S206, the processor 2 changes the tool path pattern (color) of the corresponding machining surface based on the change command input from the operator P (step S208), and returns to step S204.

In the case in which there is an input indicating that a change is not necessary in step S206, the processor 2 stores the generated tool path of the target workpiece in the storage device 1 (step S210), and the series of operations ends. In subsequently performed machine learning, the new tool path stored in the storage device 1 may be used as a set of training data. Furthermore, the generated new tool path may be actually used in machining of the machine tool 70 after being converted to NC data, and the operator P may change the generated tool path in the device 10 based on the results of actual machining. The tool path changed based on machining results may be stored in the storage device 1 and may be used as a set of training data in subsequently performed machine learning.

In the method and device 10 according to the present embodiment described above, machine learning, in which the input is geometric information of a machining surface and the output is a tool path pattern of the machining surface, is performed based on the geometric information and tool path patterns of a plurality of known workpieces, and a tool path pattern is automatically generated for each of a plurality of machining surfaces of a target workpiece based on the results of the machine learning. Thus, a new tool path can be generated based on a plurality of examples.

In the device 10 according to the present embodiment, since each of the machining surfaces is shown on the display unit 3 along with a predetermined color corresponding to the generated tool path pattern, the operator P can easily recognize which tool path pattern has been selected for the machining surface.

In the device 10 according to the present embodiment, the processor 2 is configured so as to calculate a confidence factor for the generated tool path pattern for each of the plurality of machining surfaces of the target workpiece, and when the confidence factor is less than a predetermined threshold, the display unit 3 emphasizes the corresponding machining surface. Thus, the operator can change the tool path pattern of the machining surface having the low confidence factor as needed.

Though the embodiments of the method and device for generating a tool path in NC machining have been described, the present invention is not limited to these embodiments. A person skilled in the art would understand that various modifications can be made to the embodiments described above. Furthermore, a person skilled in the art could understand that it is not necessary that the method described above be executed in the order described above, and the above method can be executed in another order as long as no conflicts are brought about thereby.

For example, a neural network is used in the machine learning in the embodiments described above. However, in another embodiment, another method (for example, a decision tree method, etc.) may be used in the machine learning.

Figure 9:
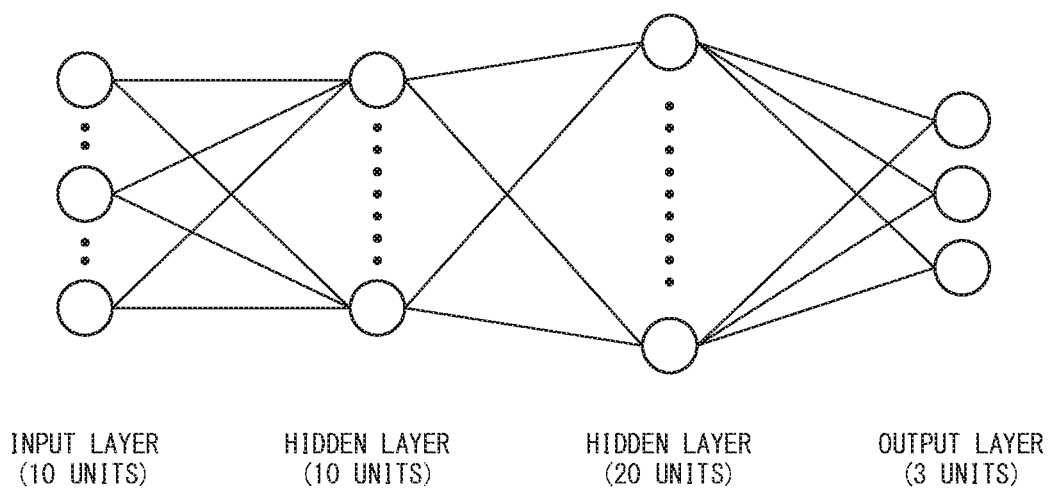
FIG. 9 is a schematic view showing a network structure.

In the present Examples, a neural network was used in the machine learning, and a multilayer perceptron (MLP) and backpropagation (BP) were used. The network structure shown in FIG. 9 was used. The conditions under which the network was used are shown in Table 1 below. The CAD software used to create the shape data of the workpieces was NX produced by Siemens, and C# was used as the programming language using the API (Application Programming Interface) of NX in system development. As training data, 20 models of past process design examples including the 4 models shown in FIGS. 3 to 6 were used. The tool paths for these 20 models were created by a skilled operator.

TABLE 1

| | |
|---|---|
| Activation function | ReLu (Rectified Linear Unit) |
| Loss function | Categorical Cross Entropy |
| Gradient descent | Mini-batch gradient descent |
| Optimization algorithm | Adam |
| Maximum Learning Repetitions | 200 |

The geometric information used as input is as described below.

(1) Surface type: type of machining surface given in CAD system (2) Ratio (x/z): ratio of a maximum length in an X-axis direction to a maximum length in a Z-axis direction on each machining surface (3) Ratio (y/z): ratio of a maximum length in a Y-axis direction to a maximum length in the Z-axis direction on each machining surface (4) Ratio (Z/z): ratio of a maximum length in the Z-axis direction of the entirety of the machining surfaces to a maximum length in the Z-axis direction of each machining surface (5) Ratio (area): ratio of a surface area of the entirety of the machining surfaces to a surface area of each machining surface (6) Radius (large): long radius of a machining surface (excluding flat or parametric curved surface)

(7) Radius (short): short radius of a machining surface (only torus or cone)

(8) Inclination angle: Z component of a normal vector at a center of gravity of a machining surface (9) Curvature (max): maximum curvature of a machining surface

(10) Curvature (min): minimum curvature of a machining surface

Figure 10:
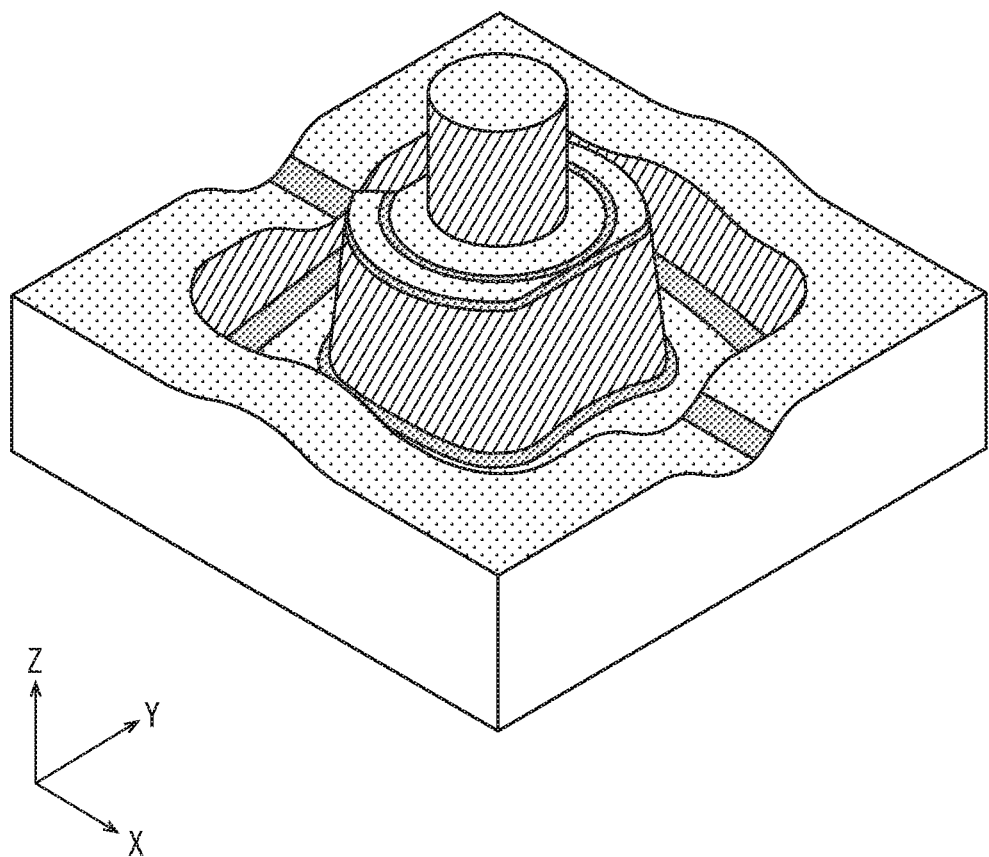
FIG. 10 is a perspective view showing a workpiece of a past process design example and a tool path of the workpiece in the past process design example, which is also used as a target workpiece for generating a new tool path.
Figure 11:
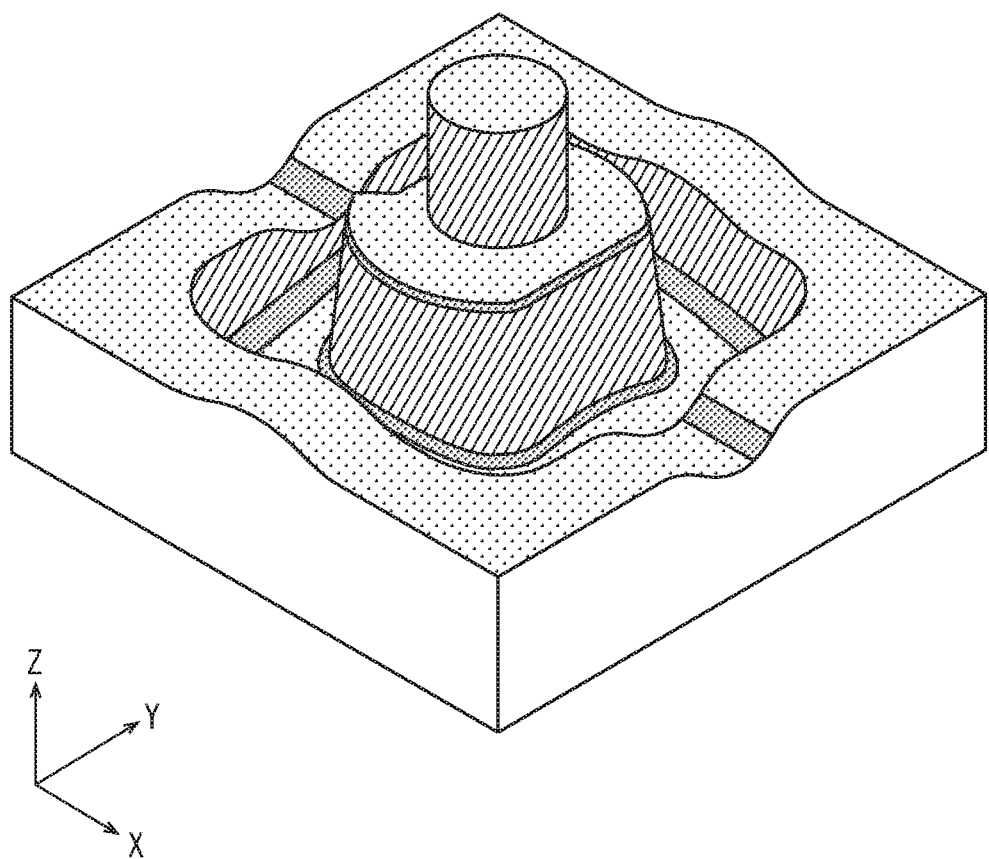
FIG. 11 is a perspective view showing a tool path generated for the target workpiece by the method of the present disclosure.

FIG. 10 is a perspective view showing a workpiece of a past process design example and the tool path of the workpiece in the past process design example, which is also used as a target workpiece for generating a new tool path, and FIG. 11 is a perspective view showing a tool path generated for the target workpiece by the method of the present disclosure. FIGS. 10 and 11 show the same shape, and this shape was used as the target workpiece. Note that the information of the past process design example shown in FIG. 10 was not used as training data.

As can be understood by comparing FIGS. 10 and 11, the present system generated a tool path which is similar to the tool path of the data of the past process design example. The specific results are shown in Table 2 below.

TABLE 2

| | | Results of Present System | | |
| --- | --- | --- | --- | --- |
| | | Red | Green | Blue |
| Data of Past | Red | 41 | 0 | 1 |
| Process Design | Green | 0 | 58 | 1 |
| Example | Blue | 0 | 0 | 87 |

As shown in Table 2, for many machining surfaces, the results of the present system and the data of the past process design examples were consistent (for both, corresponding 41 machining surfaces were red, corresponding 58 machining surfaces were green, and corresponding 87 machining surfaces were blue). The results of the present system and the data of conventional process design examples differed only for two machining surfaces. In this case, the accuracy rate was about 98.9%.

The same evaluation was performed for the 20 models of the past process design examples used as training data. As a result, the accuracy rate for all the machining surfaces of 20 models was about 91.1%. From the foregoing, it was understood that the present system can generate a tool path taking into consideration the know-how and experience of a skilled operator, based on multiple examples.

REFERENCE SIGNS LIST

1 storage device
2 processor
3 display unit
10 device
50 CAD system
60 CAM system
70 machine tool
100 system piece to be machined.

The invention claimed is:

1. A method for generating a tool path in NC machining, the method comprising: performing machine learning based on information of a plurality of known workpieces having already generated tool paths; and
generating a new tool path for a target workpiece based on results of the machine learning; wherein
each of the plurality of known workpieces and the target workpiece has a plurality of machining surfaces;
steps in which the machine learning is performed includes:
for each of the plurality of known workpieces, obtaining shape data of the plurality of known workpieces;
for each of the plurality of known workpieces, obtaining geometric information of each of the plurality of machining surfaces of the plurality of known workpieces;
for each of the plurality of known workpieces, obtaining a tool path pattern, which was selected for each of the plurality of machining surfaces of the plurality of known workpieces when a machining program was produced to machine each of the plurality of machining surfaces of each of the plurality of known workpieces, from among a plurality of tool path patterns which are contained in a CAM system which was used for producing the machining program; and
performing the machine learning in which input is the geometric information of a machining surface of the plurality of machining surfaces of the plurality of known workpieces and output is a suitable tool path pattern of the machining surface of the plurality of known workpieces using the geometric information of the plurality of known workpieces and the plurality of tool path patterns of the plurality of known workpieces; and
steps in which at least one new tool path pattern is generated includes:
obtaining shape data of the target workpiece;
obtaining geometric information of each of the plurality of machining surfaces of the target workpiece;
generating the at least one new tool path pattern for each of the plurality of machining surfaces of the target workpiece based on results of the machine learning using the geometric information of the target workpiece;
calculating a confidence factor, which is a probability that a certain machining surface is to be machined by a tool path pattern of the at least one new tool path pattern, for each of the at least one new tool path patterns;
selecting a desired tool path pattern having the highest confidence factor from the at least one new tool path pattern;
displaying the machining surfaces on a display unit along with the selected desired tool path pattern for each of the machining surfaces; and
emphasizing a corresponding machining surface of the machining surfaces when the confidence factor of the selected desired tool path pattern is less than a predetermined threshold so as to allow an operator to change the selected desired tool path pattern having the confidence factor less than the predetermined threshold.

2. The method of claim 1, wherein the plurality of tool path patterns of the known workpieces or the target workpiece include at least a contour path, a scanning line path, and a surface path.

3. The method of claim 1, wherein the shape data of the plurality of known workpieces and the shape data of the target workpiece are defined in an XYZ coordinate system which is a three-dimensional cartesian coordinate system, and
the geometric information of the plurality of known workpieces or the target workpiece includes at least one of a machining surface type, a ratio of a maximum length in an X-axis direction to a maximum length in a Z-axis direction of each machining surface of the plurality of machining surfaces, a ratio of a maximum length in a Y-axis direction to a maximum length in the Z-axis direction of each machining surface of the plurality of machining surfaces, a ratio of a Z-axis direction maximum length of the entirety of the plurality of machining surfaces to a Z-axis direction maximum length of each machining surface of the plurality of machining surfaces, a ratio of a surface area of the entirety of the plurality of machining surfaces to a surface area of each machining surface of the plurality of machining surfaces, a long radius of a machining surface of the plurality of machining surfaces, a short radius of a machining surface of the plurality of machining surfaces, a Z component of a normal vector at a center of gravity of a machining surface of the plurality of machining surfaces, a maximum curvature of a machining surface of the plurality of machining surfaces, and a minimum curvature of a machining surface of the plurality of machining surfaces.

4. The method of claim 1, wherein a neural network is used in the machine learning.

5. A device for generating a tool path in NC machining, the device comprising:
a processors; and
a display unit; wherein
the processor is configured so as to:
perform machine learning based on information of a plurality of known workpieces having already generated tool paths; and
generate a new tool path for a target workpiece based on results of the machine learning; wherein
each of the plurality of known workpieces and the target workpiece has a plurality of machining surfaces;
steps in which the machine learning is performed includes:
for each of the plurality of known workpieces, obtain shape data of the plurality of known workpieces;
for each of the plurality of known workpieces, obtain geometric information of each of the plurality of machining surfaces of the plurality of known workpieces;
for each of the plurality of known workpieces, obtain a tool path pattern, which was selected for each of the plurality of machining surfaces of the plurality of known workpieces when a machining program was produced to machine each of the plurality of machining surfaces of each of the plurality of known workpieces, from among a plurality of tool path patterns which are contained in a CAM system which was used for producing the machining program; and
perform the machine learning in which input is the geometric information of a machining surface of the plurality of machining surfaces of the plurality of known workpieces and output is a suitable tool path pattern of the machining surface of the plurality of known workpieces using the geometric information of the plurality of known workpieces and the plurality of tool path patterns of the plurality of known workpieces; and
steps in which at least one new tool path pattern is generated includes:
obtain shape data of the target workpiece;
obtain geometric information of each of the plurality of machining surfaces of the target workpiece;
generate the at least one new tool path pattern for each of the plurality of machining surfaces of the target workpiece based on results of the machine learning using the geometric information of the target workpiece;
assign each of the plurality of tool path patterns a predetermined feature which can be visually distinguished;
the processor is configured to recognize the plurality of tool path patterns as the predetermined features;
calculate a confidence factor, which is a probability that a certain machining surface is to be machined by a tool path pattern of the at least one new tool path pattern, for each of the at least one new tool path patterns generated for each of the plurality of machining surfaces of the target workpiece; and
select a desired tool path pattern that has the highest confidence factor, from the at least one new tool path pattern; and
the display unit
displays each of the machining surfaces of each of the plurality of known workpieces and/or the target workpiece along with the predetermined feature corresponding to the selected desired tool path pattern, and
emphasizes a corresponding machining surface of the machining surfaces when the confidence factor of the selected desired tool path pattern is less than a predetermined threshold so as to allow an operator to change the selected desired tool path pattern having the confidence factor less than the predetermined threshold.

* * * * *